(Model.)
W. HASSEL.
ANIMAL SHEARS.
No. 248,172. Patented Oct. 11, 1881.
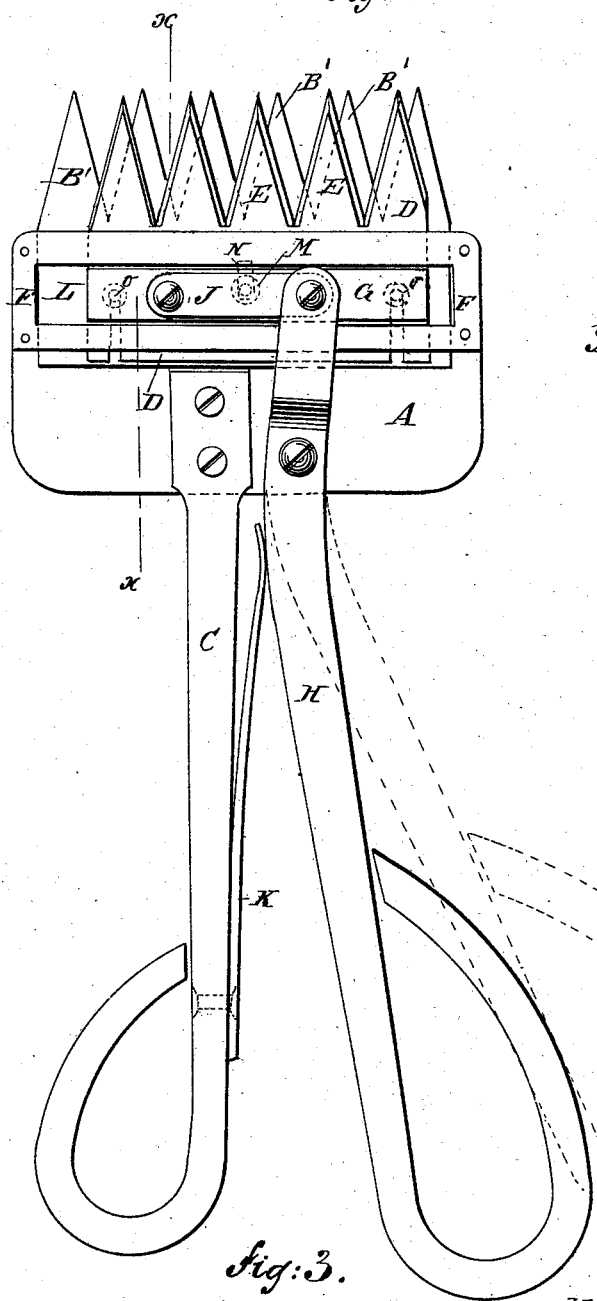
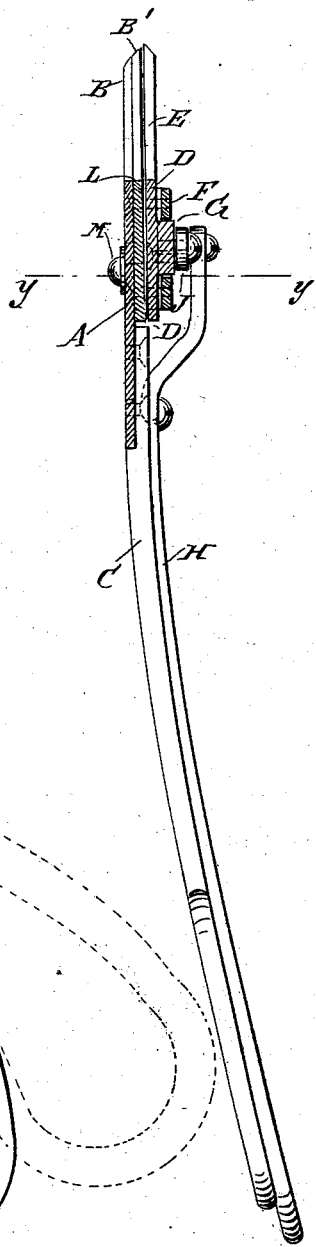
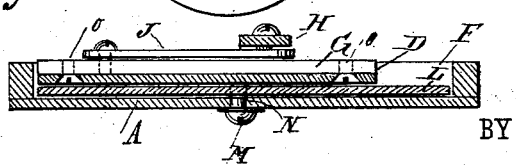
WITNESSES:
Chas. Nida.
C. Sedgwick.
INVENTOR:
W. Hassel
BY Munn & Co.
ATTORNEYS.

UNITED STATES PATENT OFFICE.

WILLIAM HASSEL, OF BRUSSELS, ILLINOIS.

ANIMAL-SHEARS.

SPECIFICATION forming part of Letters Patent No. 248,172, dated October 11, 1881.

Application filed July 18, 1881. (Model.)

*To all whom it may concern:*

Be it known that I, WILLIAM HASSEL, of Brussels, in the county of Calhoun and State of Illinois, have invented a new and Improved Sheep-Shears, of which the following is a specification.

The object of my invention is to provide a new and improved shears for clipping wool.

The invention consists in a sharp-edged toothed plate sliding on a like sharp-edged toothed plate adjustably fastened to a like toothed bed-plate having a rigid handle provided with a spring pressing against a handle pivoted to the bed-plate, and having a connecting bar or rod pivoted to its upper end, which connecting-rod is pivoted to a strip to which the sliding knife-plate is adjustably fastened, this strip sliding in a longitudinally-slotted guide-plate on the base-plate.

In the accompanying drawings, Figure 1 is a longitudinal elevation of my improved sheep-shears. Fig. 2 is a cross-sectional elevation of the same on the line $x\ x$ of Fig. 1. Fig. 3 is a horizontal sectional view of the same on the line $y\ y$ of Fig. 2.

Similar letters of reference indicate corresponding parts.

The plate A is provided with a series of beveled teeth, B, and with a handle, C, projecting from its lower edge. A plate, L, with like sharp-edged beveled teeth, B', is adjustably held on the plate A by means of a screw, M, passing through a slot, N, in the plate A and into the plate L. A plate, D, with sharp-edged beveled teeth E, rests against the plate L, on which it slides, and said plate D is adjustably fastened by screws O O to a strip, G, contained in a longitudinally-slotted guide-plate, F, fastened to the bed-plate A, the slot of this plate F being slightly longer than the strip G.

A handle, H, is pivoted to the bed-plate A, near the lower edge of the same, and to the upper end of this handle H a connecting rod or bar, J, is pivoted, which is also pivoted to the strip G. The handles C and H are pressed apart by a spring, K, fastened to the handle C. The points of the teeth B, B', and E are beveled toward the inner edge of the teeth E, so that these points cannot injure the skin of the animals when the shears are pushed forward.

The operation is as follows: The plate D slides on the plate L and is guided by the strip G, sliding in the slot of the plate F. By pressing the handles C and H together and releasing them alternately the plate D will be reciprocated on the plate L, and the wool that has passed in between the teeth, by pushing the shears forward, will be cut off, each pair of teeth cutting like scissors. The ends of the strip G strike against the ends of the plate F, and thus check the movement of the plate D. The plates L and D are the cutting-knives, and these plates can be adjusted in relation to each after loosening the screws M and o, and can be locked in the desired position by turning down these screws. Likewise the above-named plates can be removed very easily in case they are to be sharpened, or can be replaced by others. Thus, if the cutting-blades become worn off, they only need be removed, and the frame and other parts of the shears can be used with new cutting-blades.

Having thus fully described my invention, I claim as new and desire to secure by Letters Patent—

1. The combination, in animal-shears, of the sliding plate D, the plate L, the slotted plate F, and the sliding guide-strip G, whereby the plate D may be reciprocated in opposite directions, as described.

2. In sheep-shears, the combination, with the toothed plates A and L and the sliding toothed plate D, of the handle C, the strip G, fastened to the plate D, the connecting-rod J, the slotted plate F, and the pivoted handle H, substantially as herein shown and described, and for the purpose set forth.

WILLIAM HASSEL.

Witnesses:
GEORGE W. MOFFETT,
JOSEPH D. MOFFETT.